United States Patent
Uryu (10) Patent No.: US 8,544,593 B2
(45) Date of Patent: Oct. 1, 2013

(54) MOTOR DRIVE APPARATUS AND ELECTRIC POWER STEERING SYSTEM USING THE SAME

(75) Inventor: Nobuhiko Uryu, Kariya (JP)

(73) Assignee: Denso Corporation, Kariya (JP)

(*) Notice: Subject to any disclaimer, the term of this patent is extended or adjusted under 35 U.S.C. 154(b) by 222 days.

(21) Appl. No.: 13/134,971

(22) Filed: Jun. 22, 2011

(65) Prior Publication Data

US 2011/0315469 A1 Dec. 29, 2011

(30) Foreign Application Priority Data

Jun. 24, 2010 (JP) .................................. 2010-143685
Dec. 14, 2010 (JP) .................................. 2010-277963

(51) Int. Cl.
*B26D 5/08* (2006.01)

(52) U.S. Cl.
USPC ........................................ 180/443; 180/446

(58) Field of Classification Search
USPC ................................................. 180/443, 446
See application file for complete search history.

(56) References Cited

U.S. PATENT DOCUMENTS

| | | | |
|---|---|---|---|
| 6,041,884 A * | 3/2000 | Shimizu et al. | 180/443 |
| 7,091,684 B2 * | 8/2006 | Kobayashi et al. | 318/432 |
| 7,806,225 B2 * | 10/2010 | Itoh | 180/446 |
| 7,813,089 B2 * | 10/2010 | Suzuki | 361/31 |
| 7,837,004 B2 * | 11/2010 | Yasuda | 180/446 |
| 8,027,766 B2 * | 9/2011 | Nozawa et al. | 701/41 |
| 8,116,945 B2 * | 2/2012 | Nozawa | 701/41 |
| 2005/0241875 A1 * | 11/2005 | Ta et al. | 180/443 |
| 2009/0230901 A1 * | 9/2009 | Amano | 318/400.3 |
| 2009/0242293 A1 * | 10/2009 | Tanaka et al. | 180/65.285 |
| 2011/0043152 A1 * | 2/2011 | Kidokoro et al. | 318/490 |

FOREIGN PATENT DOCUMENTS

| | | |
|---|---|---|
| JP | 06-344937 | 12/1994 |
| JP | 2003-26020 | 1/2003 |
| JP | 2005-304119 | 10/2005 |
| JP | 2008-99394 | 4/2008 |

OTHER PUBLICATIONS

U.S. Appl. No. 13/134,972, filed Jun. 22, 2011, Uryu.
U.S. Appl. No. 13/134,986, filed Jun. 22, 2011, Uryu.
Office Action issued Jan. 8, 2013 in corresponding Japanese Application No. 2010-277964 with English translation.
Office Action issued Jan. 8, 2013 in corresponding Japanese Application No. 2010-277965 with English translation.
U.S. Appl. No. 12/977,449, filed Dec. 23, 2010, Satou et al.
U.S. Appl. No. 12/977,489, filed Dec. 23, 2010, Nakamura et al.
Examination Report mailed Feb. 26, 2013 in the related U.S. Appl. No. 13/134,986.

* cited by examiner

*Primary Examiner* — Paul N Dickson
*Assistant Examiner* — Michael Stabley
(74) *Attorney, Agent, or Firm* — Harness, Dickey & Pierce, PLC

(57) ABSTRACT

When an inverter or a coil set of one system in a motor drive apparatus having two systems fails, a power supply relay of a failing system interrupts power supply and a control circuit gradually reduces a current supply limitation value of a normal system to zero. Then when a steering torque becomes greater than a predetermined threshold value, the control circuit increases the current supply limitation value by a predetermined amount. By reducing the current supply limitation value to zero once and then gradually increasing the current supply limitation value to generate steering assist torque, a driver will be caused to sense changes in the steering torque and surely notice occurrence of failure.

7 Claims, 5 Drawing Sheets

MOTOR DRIVE APPARATUS AND ELECTRIC POWER STEERING SYSTEM USING THE SAME

CROSS REFERENCE TO RELATED APPLICATION

This application is based on and incorporates herein by reference Japanese patent applications No. 2010-143685 filed on Jun. 24, 2010 and No. 2010-277963 filed on Dec. 14, 2010.

FIELD OF THE INVENTION

The present invention relates to a motor drive apparatus and method, which drive an electric motor by a plurality of inverters and a plurality of coil sets, and an electric power steering system using the same.

BACKGROUND OF THE INVENTION

A motor drive apparatus disclosed in the following patent document 1 has a plurality of inverters. In this motor drive apparatus, when one of the plurality of inverters fails, electric power is stopped from being supplied from a failing inverter to a plurality of coil sets and electric power is supplied to the coil sets from normal inverters other than the failing inverter. Thus, even when one of the inverters fails, the motor can be continuously operated by driving the motor by only the normal inverters.

[Patent document 1] JP 2005-304119A

In a motor drive apparatus, a combination of one inverter and one coil set, which is paired to such an inverter, forms one power supply system. According to a prior art technology disclosed in patent document 1, when power supply to a failing system is stopped in case of detection of failure, output of the failing system falls at the same time as the occurrence of failure. As a result, motor operation rapidly changes immediately after the failure. In case that the motor drive apparatus is used, for example, as an electric power steering system for a vehicle, the rapid change in motor output will cause vehicle operation change, which a driver do not intend. It is possible to continuously compensate for the loss in motor output by the normal systems other than the failing system. The inverters in the normal systems will be loaded excessively and overheats. Although it is also possible to increase power capacity of inverters to protect the inverters from being overloaded, the inverters become large-sized and expensive.

The applicant of the present application proposed technologies, which counter the foregoing problem by two patent applications. One is a U.S. patent application Ser. No. 12/977,449 (JP application No. 2009-295533). This technology provides a motor drive apparatus, which suppresses operation changes caused by stopping an operation of a failing system upon occurrence of a failure in one of power supply systems. This is a solution to solve the problem that a rapid operation change occurs immediately after failure.

In case this technology is used in an electric power steering system of a vehicle, the operation change is suppressed by controlling inverters operating normally to compensate for loss of power, which has been supplied by a failing system, temporarily at the time of occurrence of failure. Since a driver will not sense any change in steering operation in such a case, the driver will not notice the failure.

Under a condition that one of two power supply systems of motor drive apparatus is in failure, the driver notices the failure and generally takes the vehicle to a repair shop at the earliest time. This technology intends to continue to drive the motor by one normal system so that the driver will be able to drive the vehicle to the repair shop with the same steering feeling as before the occurrence of failure. If the driver continues to use the vehicle without noticing the failure, the normal system will also fail sooner or later and steering torque will not be power-assisted at all in the end.

The second one is a U.S. patent application Ser. No. 12/977,489 (JP application No. 2009-295534). This technology provides an electric power steering system, which equalizes a maximum current command value commanded to an inverter (power converter) of a normal system after occurrence of failure to a maximum current supply value having been supplied to coils by the inverter of the normal system before occurrence of failure. This is a solution to solve the problem that the inverter of the normal system will be overloaded and overheat if it is controlled to maintain even after the occurrence of failure the same total output as before the occurrence of failure.

For example, in case that one of two systems fails, the maximum current command value is reduced to one-half from that of two systems. Thus, the inverter of the normal system is protected from being overloaded. Further, a change in the feeling of steering operation is provided to the driver by reducing the steering torque output to one-half. It is also proposed as an auxiliary measure to call driver's attention by a warning light or a buzzer at the time of failure.

The output required in the electric power steering system is reduced, however, to about one-third of output required when the vehicle is at rest, when travel speed of the vehicle becomes higher than 4 km/hr. For this reason, even if the steering assist torque output is reduced to one-half during travel of the vehicle, the driver will not sense change in steering operation feeling until a steering wheel is turned a large angle. The driver will thus not notice the occurrence of failure.

SUMMARY OF THE INVENTION

It is an object of the present invention to provide a motor drive apparatus and method, which will surely cause a driver to notice a failure when any one of inverters or coil sets fails.

According to one aspect of the present invention, a motor drive apparatus and a motor drive method are provided. The motor includes a plurality of coil sets for an electric power steering system of a vehicle. The motor drive apparatus includes a plurality of inverters for converting DC power of a DC power source to AC power for the motor. The inverters are paired with the coil sets of the motor. The motor drive apparatus reduces the power supply for the inverter that is operating normally and other than the inverter, to which power supply is interrupted, when the failure is detected. The motor drive apparatus checks whether a steering torque of a steering wheel of the vehicle is greater or less than a predetermined threshold value when the power supply is reduced. The motor drive apparatus drives the motor by only the inverter operating normally by increasing the power supply to the inverter operating normally, when the steering torque is determined to be greater than the predetermined threshold value.

BRIEF DESCRIPTION OF THE DRAWINGS

The foregoing and other objects, features and advantages of the present invention will become more apparent from the following detailed description made with reference to the accompanying drawings. In the drawings.

DETAILED DESCRIPTION OF THE PREFERRED EMBODIMENT

Embodiments of the present invention, which are used in an electric power steering system for assisting steering operation of a vehicle, will be described below with reference to the drawings.

(First Embodiment)

Figure 1:
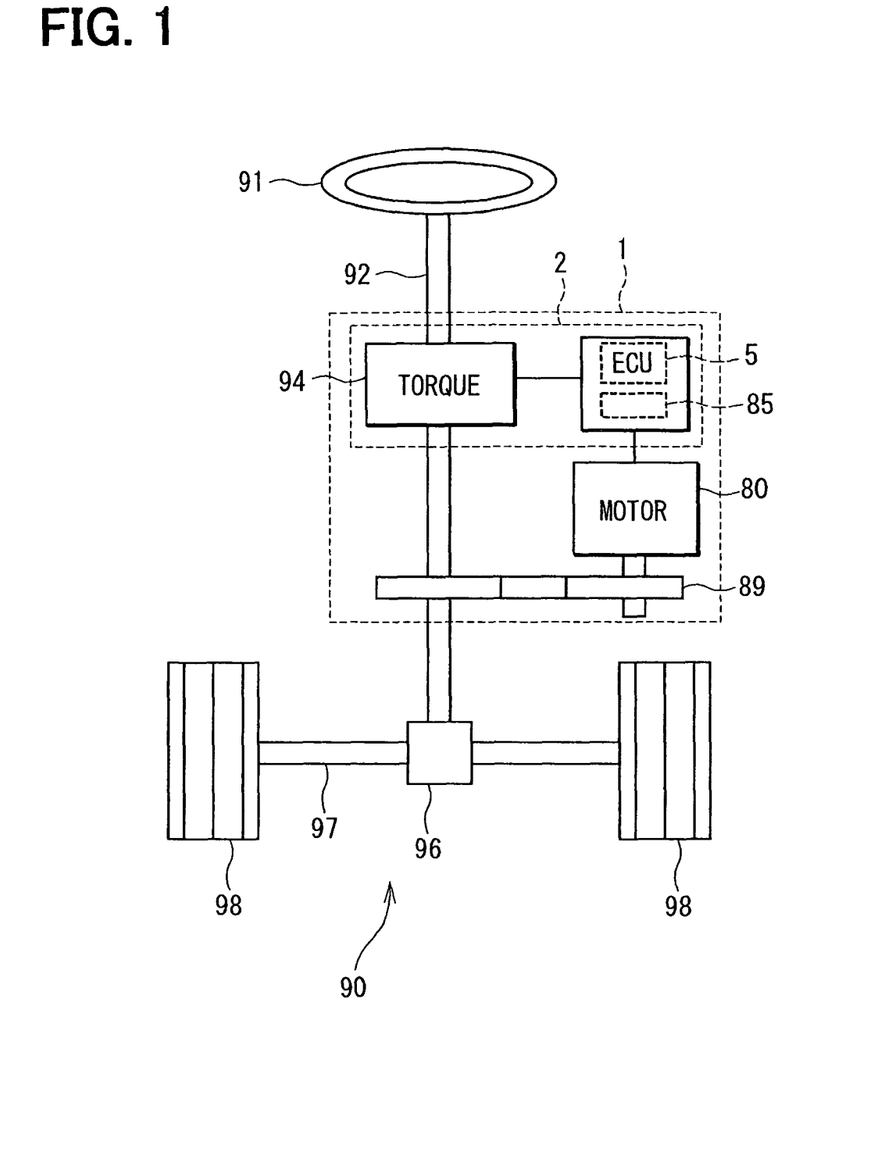
FIG. 1 is a schematic diagram of an electric power steering system, which uses a motor drive apparatus according to a first embodiment of the present invention.

Referring first to FIG. 1, an electric power steering system 1 provided in a steering system has a torque sensor 9, which detects steering torque, on a steering shaft 92 coupled to a steering wheel 91. A pinion gear 96 is attached to an end of the steering shaft 92. The pinion gear 96 is meshed with a rack shaft 97. A pair of tire wheels 98 is coupled to both ends of the rack shaft 97 rotatably through tie rods and the like.

When a driver turns the steering wheel 91, the steering shaft 92 coupled to the steering wheel 91 rotates. Rotary motion of the steering shaft 92 is converted into linear motion of the rack shaft 97 by the pinion gear 96. The pair of wheels 98 is steered by an angle corresponding to an amount of the linear motion of the rack shaft 97.

The electric power steering system 1 is provided with an electric motor 80 for generating steering assist torque, a reduction gear 89 for reducing and transferring rotation of the motor 80 to the steering shaft 92, and a motor drive apparatus 2. The motor 80 is a three-phase brushless motor and rotates the reduction gear 89 in forward and reverse directions. The reduction gear 89 is a motive power transfer device. The motor drive apparatus 2 includes an electronic control unit (ECU) 5, which includes, in addition to the torque sensor 94, a rotation angle sensor 85 for detecting a rotation angle of the motor 80 and other sensors. According to this construction, the electric power steering system 1 generates steering assist torque for assisting steering operation of the steering wheel 91 and transfers it to the steering shaft 92.

Figure 2:
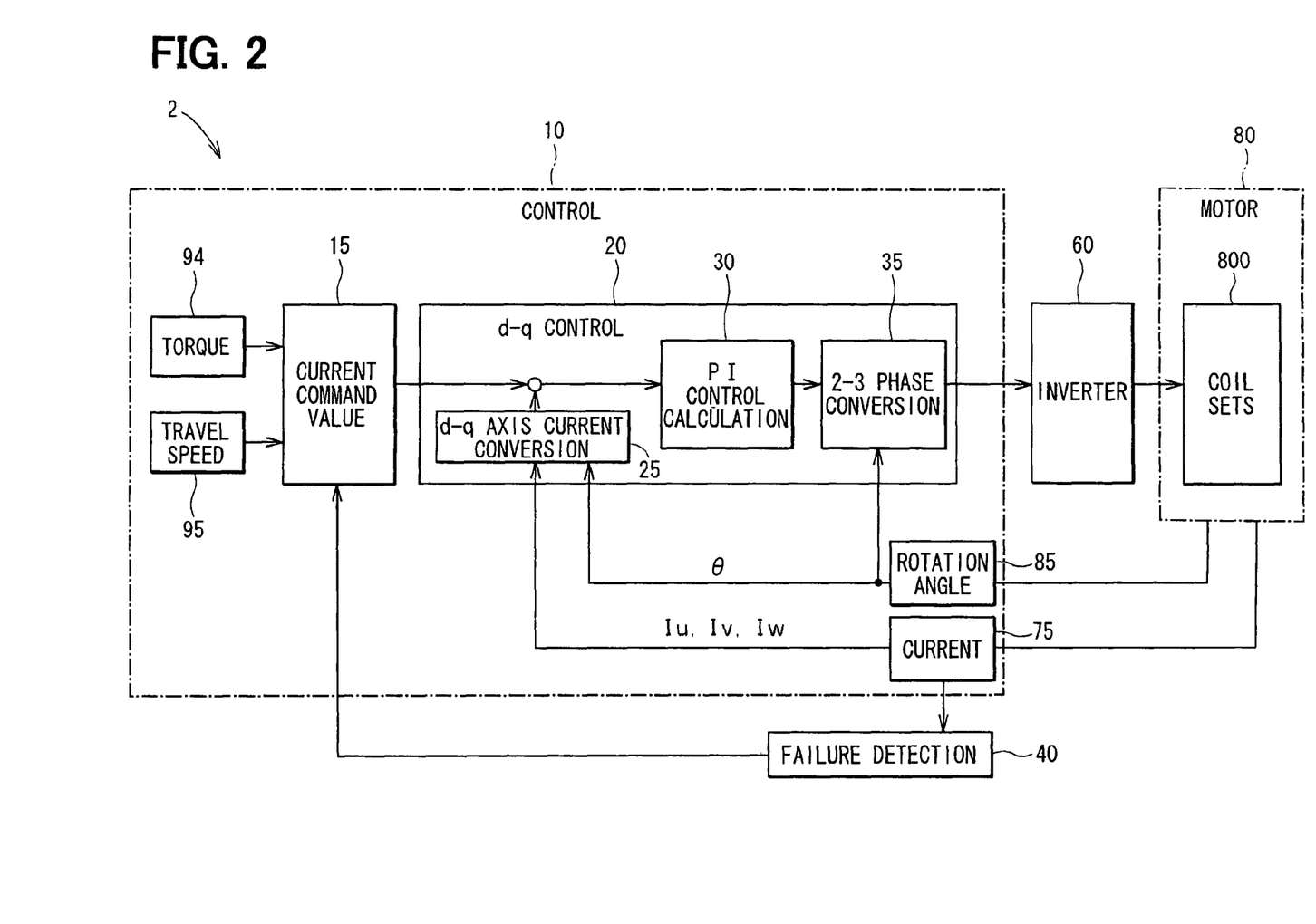
FIG. 2 is a control block diagram of the motor drive apparatus according to the first embodiment of the present invention.

As shown in FIG. 2, the motor drive apparatus 2 includes a control circuit 10, a failure detection circuit 40 and an inverter circuit 60 as the ECU 5. The control circuit 10 includes a current command value calculation section 15 and a d-q control section 20. The control circuit 10 is shown as including a current sensor 75, a vehicle travel speed sensor 95 and the like in addition to the rotation angle sensor 85 and the torque sensor 94. The current command value calculation section 15 inputs a steering torque detection value of the torque sensor 94 and a travel speed detection value of the travel speed sensor 95, and outputs a current command value to the d-q control section 20. The current command value calculation section 15 further inputs a failure detection output of the failure detection circuit 40 to change the current command value when the failure detection output is applied.

The d-q control section 20 is formed of a d-q axis current conversion section 25, a PI control calculation section 30 and two-phase to three-phase (2-3 phase) conversion section 35. The d-q axis conversion section 25 D-Q-converts phase current detection values Iu, Iv and Iw of the current sensor 75 to a d-axis current and a q-axis current based on a motor electric angle θ, which is detected by the rotation angle sensor 85 and fed back. The d-axis current and the q-axis current are parallel and orthogonal to the direction of magnetic flux, respectively. The d-axis current and the q-axis current outputted by the d-q axis conversion section 25 are fed back to the current command value calculation section 15. The PI control calculation section 30 calculates an output value by proportional-and-integral control based on a difference between the command value and the detection value. The two-phase voltage command value outputted by the PI control calculation section 30 is converted into three-phase voltages of U-phase, V-phase and W-phase by the two-phase to three-phase conversion section 35 and those voltages are outputted to the inverter circuit 60. The electric angle θ detected by the rotation angle sensor 85 is also fed back to the two-phase to three-phase conversion section 35.

AC power generated by the inverter circuit 60 is supplied to the coil sets to drive the motor 80. The current sensor 75 detects output currents of the inverter circuit 60 phase by phase. The rotation angle sensor 85 detects the rotation angle from a center position of the steering wheel by detecting the motor electric angle θ.

Figure 3:
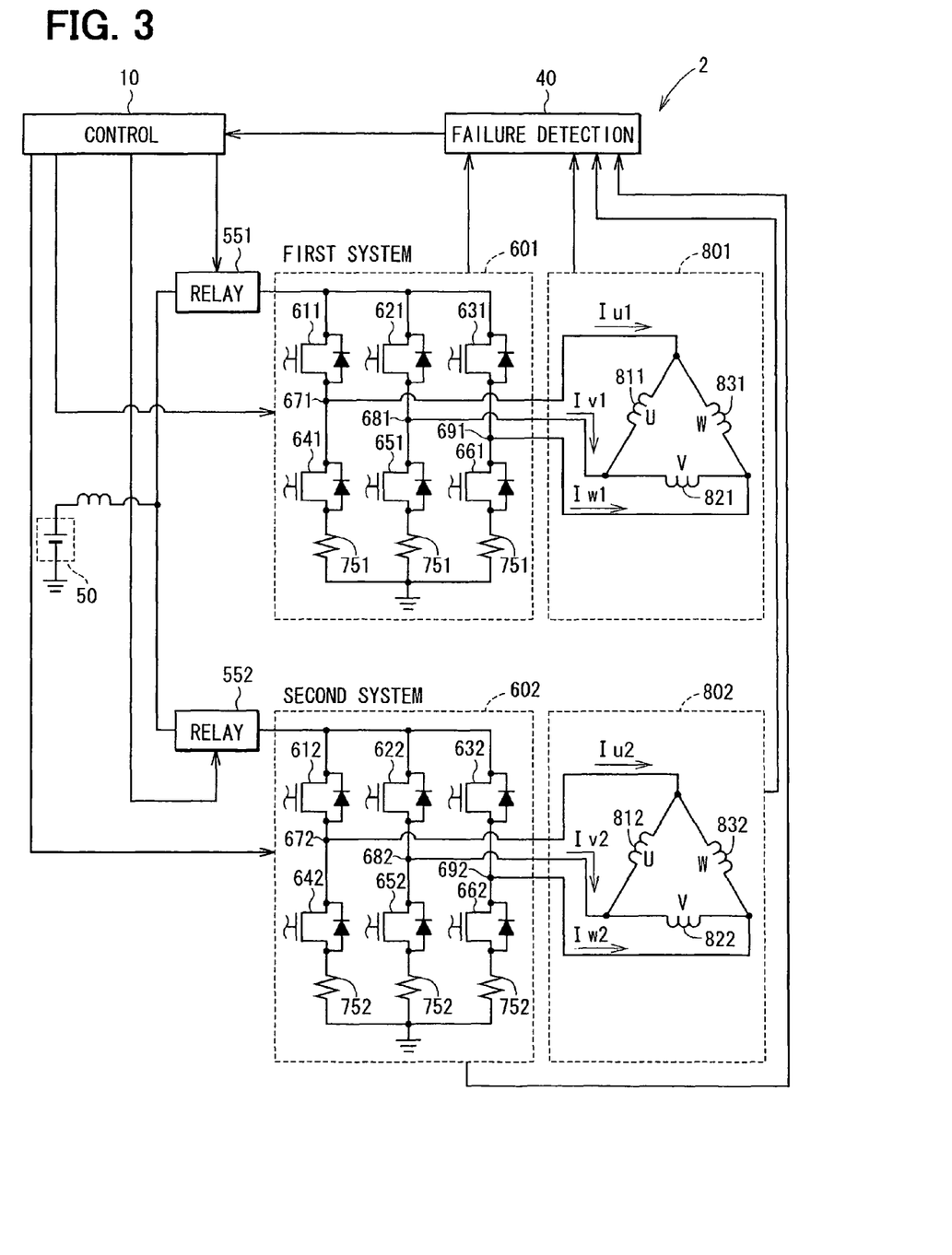
FIG. 3 is a circuit diagram of the motor drive apparatus according to the first embodiment of the present invention.

FIG. 3 shows an exemplary circuit of the motor drive apparatus 2 for two power supply systems. "System" means a pair of one inverter and one coil set (set of coils) corresponding to one inverter. The first system is formed of an inverter 601 and a coil set 801. The second system is formed of an inverter 602 and a coil set 802. The motor drive apparatus 2 may be formed of N systems (N is an integer equal to 3 or more). In such a case, similar systems are added in parallel up to as many as N-th system in FIG. 3.

As shown in FIG. 3, a DC power source 50 of the motor drive apparatus 2 supplies electric power in parallel to the inverter 601 of the first system and the inverter 602 of the second system. Power supply relays 551 and 552 conduct or interrupt power supply from the DC power source 50 to the inverters 601 and 602, respectively. Each of the power supply relays 551 and 552 is a power supply conduction and interruption section.

Since the inverter and the coil set in each of the first system and the second system are the same, the first system is described as an example. Structural elements of the second system correspond to those of the first system. The structural elements in the first system have the last number "1" of reference numerals, and the structural elements of the second system have the last number "2" of reference numerals.

The inverter 601 is a voltage-type PWM inverter, which generates three-phase AC power of U-phase, V-phase and W-phase from DC power. The inverter 601 is formed of a bridge circuit including high-side FETs 611, 621, 631, which are switching elements at the power source voltage side, and low-side FETs 641, 651, 661, which are switching elements at the ground side.

The high-side FETs 611, 621, 631 have drains, which are connected to a power supply line at an output side of the power supply relay 551, and sources, which are connected to drains of the low-side FETs 641, 651, 661. The low-side FETs 641, 651, 661 have sources, which are grounded through shunt resistors 751, respectively. The shunt resistors 751 are parts of the current sensor 75 shown in FIG. 2 and detect phase currents Iu1, Iu2, Iu3 flowing in a U1-coil 811, a V1-coil 821, a W1-coil 831, respectively, which will be described later.

In the U-phase, the source of the high-side FET 611 and the drain of the low-side FET 641 are connected to a U1-terminal 671. The U1-terminal 671 is connected to one end of the U1-coil 811. In the V-phase, the source of the high-side FET 621 and the drain of the low-side FET 651 are connected to a V1-terminal 681. The V1-terminal 681 is connected to one end of the V1-coil 821. In the W-phase, the source of the high-side FET 631 and the drain of the low-side FET 661 are connected to a W1-terminal 691. The W1-terminal 691 is connected to one end of the W1-coil 831.

The motor 80 has magnetic poles on a rotor and the three-phase coils, which are U1-coil 811, V1-coil 821 and W1-coil 831, on a stator. Here, for example, "U1-coil" means a U-phase coil of the first system. The U1-coil 811, the V1-coil 821 and the W1-coil 831 are connected in a Δ-shape to form the coil set 801. The coil set 801 is supplied with the three-phase AC power from the inverter 601 and drives the motor 80 jointly with the coil set 802 of the second system. Thus, the inverter 601 and the coil set 801 are paired in the first system, and the inverter 602 and the coil set 802 are paired in the second system.

The failure detection circuit 40 detects failure of the inverter 601 or the coil set 801 by detecting the phase currents Iu1, Iv1, Iw1, which flow from the phase terminals 671, 681, 683 to the coils 811, 821, 831, respectively, by the shunt resistors 751. The control circuit 10 sets the current command values as target current values, which are to be outputted from the inverter 601 to the coil set 801 based on the signal from the failure detection circuit 40, the rotation angle detection value of the rotation angle sensor 85, the steering torque detection value of the torque sensor 94, the travel speed detection value of the travel speed sensor 95 and the like.

Figure 4:
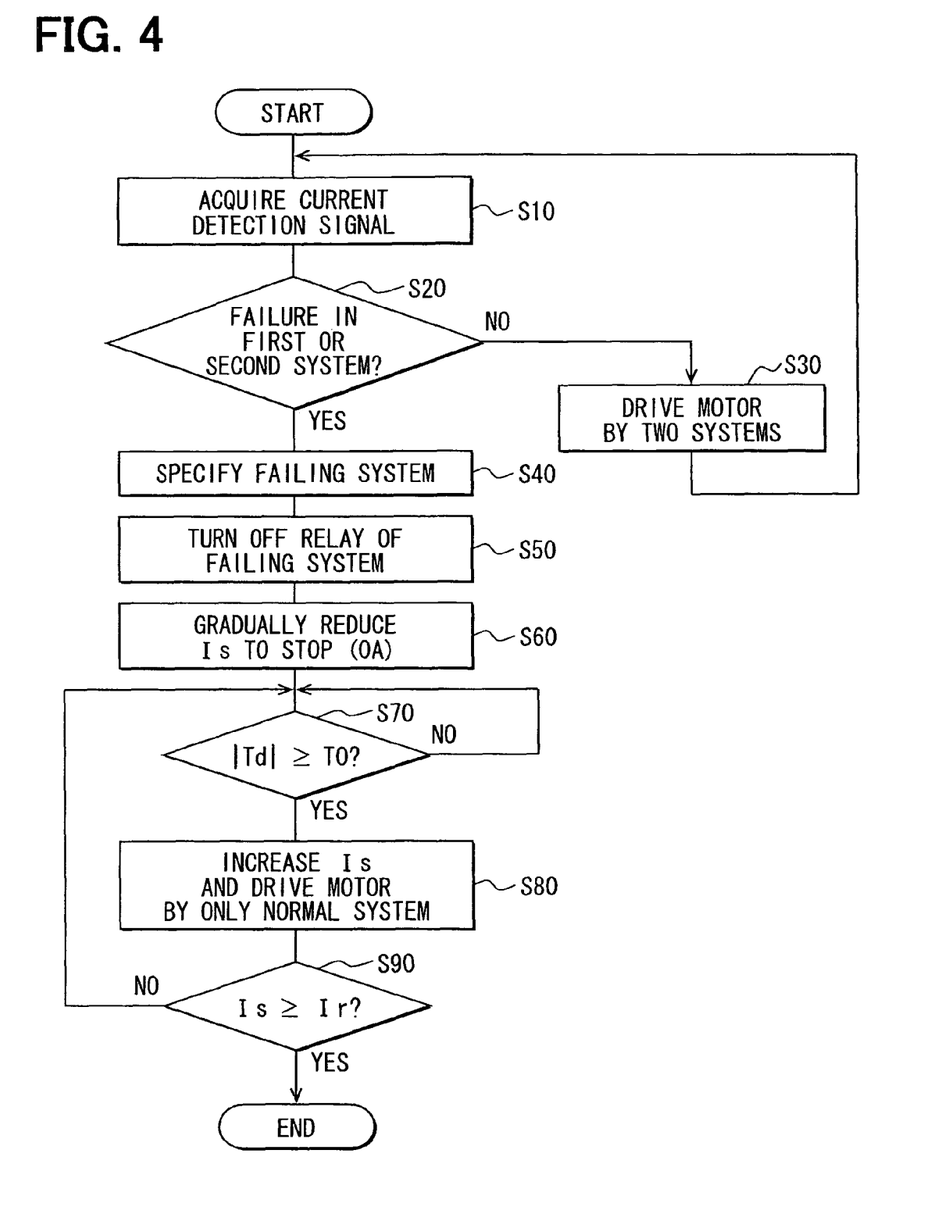
FIG. 4 is a flowchart of failure detection of the motor drive apparatus according to the first embodiment of the present invention.

Operation of the motor drive apparatus 2 at failure detection time will be described next with reference to a flowchart in FIG. 4. In the following description of flowchart, S indicates a step.

While the motor 80 is being driven, the failure detection circuit 40 acquires the current detection signal of the current sensor 75 at S10. The failure detection circuit 40 checks at S20 whether failure of the inverter 601, 602 or the coil 801, 802 has been detected. If NO (no failure) at S20, the control circuit 10 drives the motor 80 by two systems in the same manner as in the normal case at S30. If YES (failure) at S20, the control circuit 10 specifies at S40 a failing system, which is not operating normally.

It is assumed in the following description that the inverter 601 or the coil set 801 of the first system is in failure. At S50, the control circuit 10 interrupts current supply from the DC power source 50 to the inverter 601 by turning off the power supply relay 551 provided in the first system, which is in failure. A current supply limitation value for the inverter 601 becomes 0 after this time.

It is assumed here that the inverter 601 or the coil set 801 of the first system is in failure. At S50, the control circuit 10 turns off the power supply relay 551, which corresponds to the first system in failure, thereby to interrupt power supply to the inverter 601. At the subsequent step S60, the control circuit 10 gradually reduces to zero the current supply limitation value Is provided for the inverter 602, which is normal, so that the assist power of the motor 80 generated by the second system is reduced to zero. The current supply limitation value Is a value of current, by which the current supplied to the motor 80 in correspondence to the current command value is limited.

At S70, the control circuit 10 checks whether an absolute value of the present steering torque Td is equal to or greater than a threshold value T0. It is assumed that the steering toque value is positive and negative when the steering wheel 91 is turned in the clockwise direction and the counter-clockwise direction, respectively. That is, the absolute value of the steering torque Td being equal to or greater than zero indicates that the steering wheel 91 is being turned in the clockwise direction or the counter-clockwise direction with torque, which is equal to or greater than the threshold value T0. The threshold value T0 is set to 5 Nm, for example. Steering toque of 5 Nm is a value, by which a driver will feel that steering is heavy and steering operation needs considerable power. If YES at S70, S80 is executed. If NO at S70, the present value of the steering torque Td is detected repetitively.

At S80, the control circuit 10 increases the current supply limitation value Is for the inverter 602, which has been reduced to zero once at S60, thereby to drive the motor 80 by only the second system operating normally. The driver will feel that steering operation needs more power than normal, when the steering torque detection value Td is determined to be less than the threshold value T0. When the steering torque detection value Td becomes greater than the threshold value T0, steering assist torque is generated and the driver will feel that steering operation needs less power. If the steering torque detection value Td continues to exceed the threshold value, the current supply limitation value Is increases in proportion to time of continuation.

At S90, the control circuit 10 checks whether the present value of the current supply limitation value Is is less than a predetermined maximum current limitation value Ir. If NO, the control circuit 10 executes S70 to detect the present value of the steering torque Td. If YES, the control circuit 10 ends processing of increasing the current supply limitation value Is.

Figure 5:
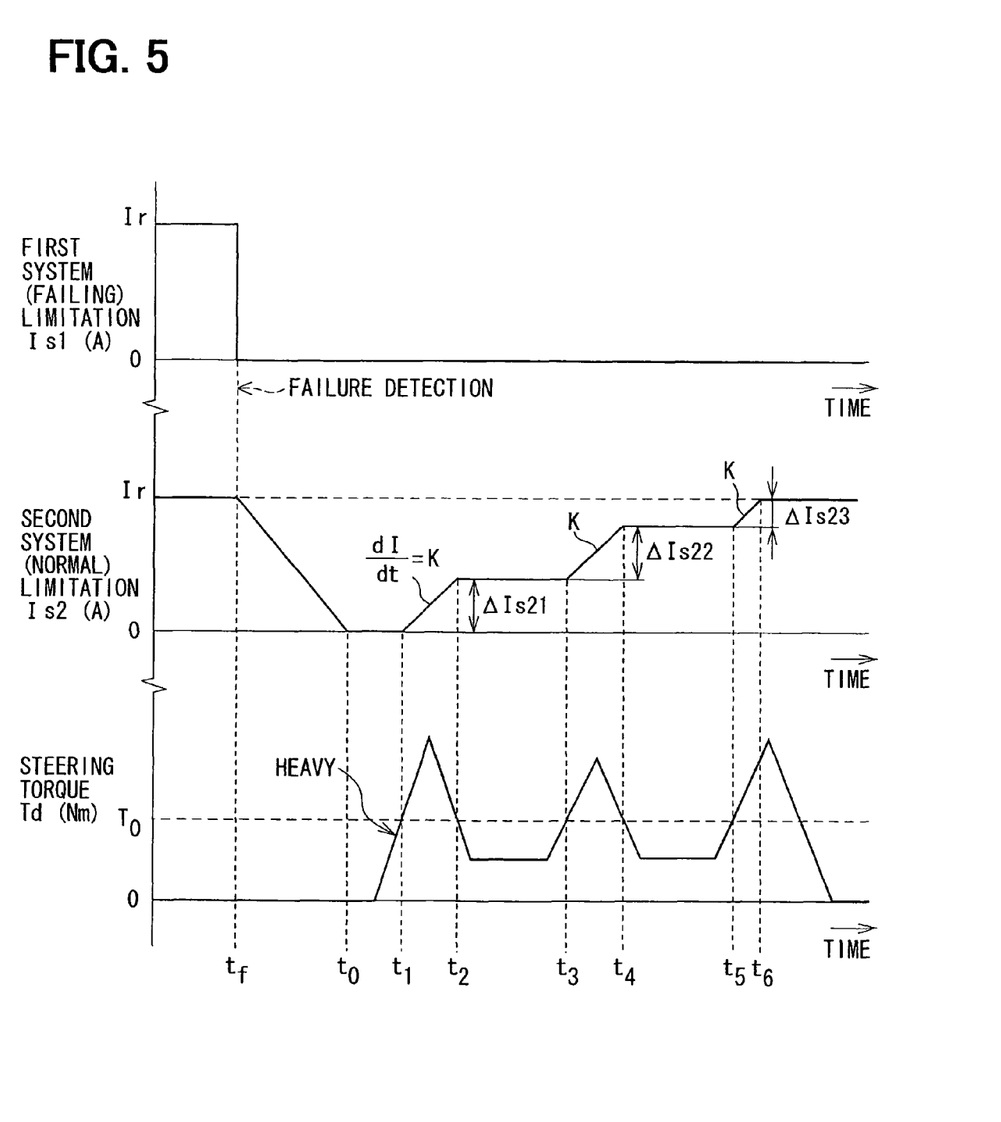
FIG. 5 is a waveform of a current limitation value and a steering torque at the time of failure detection of the motor drive apparatus according to the first embodiment of the present invention.

Operation of the motor drive apparatus 2 at the time of failure detection is shown in FIG. 5. It is assumed here that the invert 601 or the coil set 801 of the first system fails. Until a failure is detected at time tf, both the current supply limitation values Is1 and Is2 of the first system and the second system are set to the normal-time maximum current limitation value Ir. The motor 80 is driven with total power of the first system and the second system.

When the failure detection circuit 40 detects at time tf the failure in the inverter 601 or the coil set 801 of the first system, the control circuit 10 turns off the power supply relay 551 of the first system thereby to interrupt supply of power from the DC power source 50 to the inverter 601 of the first system. As a result, the current supply limitation value Is1 of the first system becomes zero as shown by (a) in FIG. 5.

The control circuit 10 starts to gradually reduce the current supply limitation value Is2 of the second system operating normally from the maximum current limitation value Ir as shown by (b) in FIG. 5. The current supply limitation value Is2 of the second system becomes zero at time t0. That is, the electric power steering system 1 does not generate the steering assist torque any more.

When the steering torque detection value Td becomes T0 or greater at time t1 as shown by (c) in FIG. 5, the control circuit 10 starts to increase the current supply limitation value Is2 of the second system. The amount of increase at this time is proportional to time, for which the steering torque detection value Td remains to be greater than the threshold value T0. That is, a time derivative value (dI/dt) of the current supply limitation value is used as a proportional constant. This increase is continued until the steering torque detection value Td falls below the threshold value T0 at time t2. During the period from time t1 to time t2, the current supply limitation value Is2 increases by an amount ΔIs21.

In case that a vehicle is traveling straight, for example, at the time the failure is detected at time tf, a driver may possibly not sense the failure because no steering torque is generated by the driver. When the driver starts to turn the steering wheel 91 after time t0, the steering assist torque, which is normally provided, is not provided any more. The driver will feel that steering is heavy as the steering torque detection value Td approaches the threshold value T0. The threshold value T0 is set to, for example, 5 Nm, which drivers will feel heavy. The steering assist torque is generated from time t1, the driver will feel that steering became lighter. Thus, the driver is caused to feel changes in the steering torque and surely notice occurrence of failure. The driver is motivated to take a vehicle to a repair shop soon.

From time t2 to time t3, during which the steering torque detection value Td is less than the threshold value T0, the current supply limitation value Is2 provided at time t2 is maintained. When the steering torque detection value Td becomes greater than the threshold value T0 again From time t3 to time t4, the current supply limitation value Is2 increases by an amount ΔIs22, which is a product of the proportional constant K and the time interval from time t3 to time t4.

Then, during a period from time t4 to time t5, in which the steering torque detection value Td remains to be less than the threshold value T0, the current supply limitation value Is2 remains the same as that of time t4. Thus, the current supply limitation value Is2 increases stepwise.

When the steering torque detection value Td becomes greater than the threshold value T0 at time t5, the current supply limitation value Is2 increases again. The control circuit 10 however stops increasing the current supply limitation value Is2, when the current supply limitation value Is2 increases by an amount ΔIs23 in a time interval from time t5 to t6 and reaches the normal-time maximum current limitation value Ir at time t6. After time t6, the current supply limitation value Is2 is maintained at the normal-time maximum current limitation value Ir.

When the driver needs to operate the steering wheel 91 before taking the vehicle to the repair shop, the inverter 602 of the second system drives the motor 80 with the current of less than the current supply limitation value Is2 after time t1. As a result, the driver can operate the steering wheel 91 with a certain amount of steering assist torque. The inverter 602 of the second system drives the motor 80 with the current of less than the maximum current limitation command value Ir of normal time after time t6. As a result, the driver can operate the steering wheel 91 with steering assist torque, which is provided by one of the two systems and corresponds to one-half of the steering assist torque provided normally. The driver is thus allowed to drive the vehicle to the repair shop while operating the steering wheel 91 with the steering assist torque, which is less than that of the normal time.

(Advantage)

The motor drive apparatus 2 according to the first embodiment has the following advantages.

(1) When the failure in the inverter 601 or the coil set 801 of the first system is detected, the control circuit 10 temporarily reduces the current supply limitation value Is2 provided for the second system operating normally to zero. When the driver tries to operate the steering wheel 91 to drive the vehicle, the driver is put in such a condition that, the steering assist torque is not generated at all for a certain time period but is then generated when the steering torque detection value Td exceeds the predetermined threshold value T0. Thus the driver is caused to sense the changes in the steering torque and surely notice the failure. It never arises that the driver continues to drive the vehicle without noticing the failure, the second system also fails and the steering operation is not power-assisted.

(2) After causing the driver to notice the changes in the steering torque, the current supply limitation value Is2 of the second system is increased. The driver can thus drive the vehicle to the repair shop with the steering assist torque.

(3) As far as the steering torque detection value Td is equal to or greater than the threshold value T0, the amount of increase of the current supply limitation value Is2 of the second system is determined in proportion to the interval of time, in which the steering torque detection value Td exceeds the threshold value T0. As a result, the current supply limitation value Is2 can be controlled easily.

(4) While the steering torque detection value Td is less than the threshold value T0, the current supply limitation value Is2 is increased in steps to maintain the current supply limitation value Is2 of the second system at the value, which is equal to the immediately previous value. The driver feels that the steering is heavy for a moment first and then feels a gradual increase of the steering assist torque. Thus the steering operation feeling is improved gradually.

(5) By setting the maximum current limitation value Ir as the upper limitation value of the current supply limitation value Is2, the inverter 602 in the normally operating second system is protected from overheating due to excessive load. Specifically, by setting the maximum current limitation value Ir to equal to or about the maximum current limitation value Ir, which the inverter 602 supplied to the coil set 802 before the failure is detected, the inverter 602 can operate with the same or less loading in comparison to that before the failure detection.

(Other Embodiments)

(A) In the first embodiment, the case, in which the steering torque detection value Td is equal to the torque threshold T0, is included in the case, in which the steering torque detection value Td is greater than the torque threshold T0. It is also practically possible to include the case, in which the steering torque detection value Td is equal to the torque threshold value T0, in the case, in which the steering torque detection value Td is less than the torque threshold value is less than the torque threshold value T0. This is also true for the rotation angle.

(B) According to the first embodiment, the current supply limitation value Is is increased by the amount in proportion to the time interval, during which the steering torque detection value Td exceeds the threshold value T0 so that the time derivative value (dI/dt) is maintained constant. However, the time derivative value (dI/dt) of the current supply limitation value may be increased or decreased in accordance with time. If the time derivative value is increased in proportion to time, the current supply limitation value increases first with a small time-change rate and then with a gradually increasing time-change rate. If the time derivative value is decreased in proportion to time, the current supply limitation value decreases first with a large time-change rate and then with a gradually decreasing time-change rate. It is preferred that the time derivative value is determined to cause the driver to notice the failure in the most appropriate manner.

(C) In the first embodiment, the maximum current value limitation value Ir, which is the upper limitation value of the current supply limitation value, is set to be about the same as the normal-time maximum current limitation value, which has been outputted to the coils by the inverter operating normally before the failure detection. However it is also possible to set a different maximum current limitation value. This maximum current limitation value Ir is preferably set to a value, which will not overload the inverter.

(D) It is also possible to call driver's attention by caution means such as a warning light and buzzer in addition to the vibration application processing at the time of failure detection.

The present invention is not limited to such embodiments as described above and may be implemented in other different embodiments without departing from the spirit of the invention.

What is claimed is:

1. A motor drive apparatus for driving a motor, which assists steering operation of a driver, the motor drive apparatus comprising:
    a DC power source;
    a plurality of inverters for converting electric power of the DC power source to AC power;
    a plurality of coil sets, provided in correspondence to the plurality of inverters, for driving the motor by currents supplied from the plurality of inverters;
    a failure detection circuit for detecting failure in the inverters or the coil sets by detecting currents flowing in the inverters or the coil sets;
    a power interruption section capable of interrupting power supply from the DC power source to the inverters;
    a torque sensor for detecting steering torque, by which a driver operates a steering wheel; and
    a control circuit for setting a command value of the current outputted from the inverter to the coil set and setting a current supply limitation value, which is an upper limitation value of the current command value,
    wherein, when the failure detection circuit detects the failure in any one of the inverters and the coil sets,
    the power supply interruption section interrupts power supply to the inverter that corresponds to the inverter or the coil set, which is detected as having failure, and
    the control circuit reduces the current supply limitation value for the inverter that is operating normally and other than the inverter, to which power supply is interrupted, and then increases the current supply limitation value for the inverter operating normally by a predetermined amount when a detection value of the steering torque detected by the torque sensor exceeds a predetermined threshold value.

2. The motor drive apparatus according to claim 1, wherein:
    the control circuit increases the current supply limitation value for the inverter operating normally by the predetermined amount in proportion to an interval of time, during which the detection value of the steering torque exceeds the predetermined threshold value.

3. The motor control apparatus according to claim 1, wherein:
    the control circuit maintains the current supply limitation value for the inverter operating normally at a value, which is provided immediately before the detection value of the steering torque falls below the predetermined threshold value, when the detection value of the steering torque is less than the predetermined value.

4. The motor drive apparatus according to claim 1, wherein:
    the control circuit maintains the current supply limitation value at a predetermined maximum current limitation value after the current supply limitation value for the inverter operating normally reaches the predetermined maximum current limitation value.

5. The motor drive apparatus according to claim 4, wherein:
    the predetermined maximum current limitation value is generally the same as the current, which the inverter operating normally has supplied to the corresponding coil set before detection of the failure.

6. An electric power steering system comprising:
    a motor for assisting steering operation of a driver;
    a power transfer device for transferring rotation of the motor to a steering shaft; and
    the motor drive apparatus according to claim 1.

7. The motor drive apparatus according to claim 1, wherein:
    the control circuit gradually reduces the current supply limitation value to zero and after the current supply limitation reaches the value zero, the control circuit allows the current supply limitation value to increase when the detected value of the steering torque exceeds the predetermined threshold value.

* * * * *